United States Patent
Onodera et al.

(10) Patent No.: US 10,370,784 B2
(45) Date of Patent: Aug. 6, 2019

(54) MESH NONWOVEN FABRIC

(71) Applicant: JXTG Nippon Oil & Energy Corporation, Tokyo (JP)

(72) Inventors: Takashi Onodera, Tokyo (JP); Hideo Kumehara, Tokyo (JP); Hiroshi Yazawa, Tokyo (JP); Yasuo Sasaki, Tokyo (JP); Shuichi Murakami, Tokyo (JP)

(73) Assignee: JXTG Nippon Oil & Energy Corporation (JP)

( * ) Notice: Subject to any disclaimer, the term of this patent is extended or adjusted under 35 U.S.C. 154(b) by 0 days.

(21) Appl. No.: 15/512,178

(22) PCT Filed: Sep. 15, 2015

(86) PCT No.: PCT/JP2015/076166
§ 371 (c)(1),
(2) Date: Mar. 17, 2017

(87) PCT Pub. No.: WO2016/043190
PCT Pub. Date: Mar. 24, 2016

(65) Prior Publication Data
US 2017/0275794 A1 Sep. 28, 2017

(30) Foreign Application Priority Data
Sep. 19, 2014 (JP) .................. 2014-191508

(51) Int. Cl.
D04H 13/02 (2006.01)
D04H 3/045 (2012.01)
(Continued)

(52) U.S. Cl.
CPC .......... D04H 13/02 (2013.01); B29C 70/086 (2013.01); B29C 70/687 (2013.01); B32B 5/022 (2013.01); D04H 3/045 (2013.01); D04H 13/00 (2013.01)

(58) Field of Classification Search
CPC ...................................... D04H 13/02
(Continued)

(56) References Cited

U.S. PATENT DOCUMENTS

| 2,728,950 A | 1/1956 | Annesser |
| 3,662,935 A | 5/1972 | Yazawa et al. |

(Continued)

FOREIGN PATENT DOCUMENTS

| CN | 1192958 A | 9/1998 |
| CN | 103857525 A | 6/2014 |

(Continued)

OTHER PUBLICATIONS

International Preliminary Report on Patentability, Chapter I, for Application No. PCT/JP2015/076166 dated Mar. 30, 2017.

(Continued)

*Primary Examiner* — Brent T O'Hern
(74) *Attorney, Agent, or Firm* — Lerner, David, Littenberg, Krumholz & Mentlik, LLP

(57) ABSTRACT

A mesh nonwoven fabric which is seamless and excellent in appearance is provided. A seamless mesh nonwoven fabric is prepared by laminating a first mesh film 20 containing stem fibers 20a stretching parallel to each other in a first direction and branch fibers 20b connecting adjacent stem fibers 20a together, and a second mesh film 30 containing stem fibers 30a stretching parallel to each other in a second direction intersecting the first direction and branch fibers 30b connecting adjacent stem fibers 30a.

6 Claims, 4 Drawing Sheets

(51) Int. Cl.
*B29C 70/08* (2006.01)
*B29C 70/68* (2006.01)
*B32B 5/02* (2006.01)
*D04H 13/00* (2006.01)

(58) Field of Classification Search
USPC .......................................................... 428/100
See application file for complete search history.

(56) References Cited

U.S. PATENT DOCUMENTS

| | | | |
|---|---|---|---|
| 3,693,851 A | | 9/1972 | Yazawa |
| 4,489,630 A | | 12/1984 | Okada et al. |
| 5,032,442 A | * | 7/1991 | Yamazaki ............... B29D 28/00 |
| | | | 428/105 |
| 5,290,377 A | | 3/1994 | Aihara et al. |
| 6,106,924 A | | 8/2000 | Yamazaki |
| 2015/0004860 A1 | | 1/2015 | Harashige et al. |

FOREIGN PATENT DOCUMENTS

| | | |
|---|---|---|
| GB | 849436 A | 9/1960 |
| JP | 47002786 | 1/1972 |
| JP | 51038980 | 9/1976 |
| JP | 52004672 | 2/1977 |
| JP | 55107427 | 8/1980 |
| JP | 57030368 B2 | 6/1982 |
| JP | 61011757 B | 4/1986 |
| JP | 04082953 | 3/1992 |
| JP | 08074164 | 3/1996 |
| JP | 11156986 | 6/1999 |
| JP | 2001277374 A | 10/2001 |
| JP | 2003105632 A | 4/2003 |
| JP | 2009091697 A | 4/2009 |
| JP | 2011174201 A | 9/2011 |
| TW | 155784 | 4/1991 |

OTHER PUBLICATIONS

Chinese Search Report for Application No. 201580050474.X dated Sep. 28, 2018.
Taiwanese Patent Office Action for Application 104130724 dated May 2, 2019, 10 pages.

* cited by examiner

MESH NONWOVEN FABRIC

CROSS REFERENCE TO RELATED APPLICATIONS

The present application is a national phase entry under 35 U.S.C. § 371 of International Application No. PCT/JP2015/076166 filed Sep. 15, 2015, published in Japanese, which claims priority from Japanese Patent Application No. 2014-191508, filed on Sep. 19, 2014, all of which are incorporated herein by reference.

BACKGROUND OF THE INVENTION

Technical Field

The present invention relates to a mesh nonwoven fabric, and particularly relates to a seamless mesh nonwoven fabric.

Background Art

A split-fiber nonwoven fabric (fibrillated-film nonwoven fabric) of the present applicants is known (see, for example, patent documents 1 and 2). Such split-fiber nonwoven fabric is obtained by molding a molten resin into a film by means of a T-die or a tubular die, stretching the film, then subjecting the film to fiber splitting to obtain split fibers having a mesh structure, spreading the split fibers over a certain width and fixing them, and laminating the split fibers longitudinally and transversely so that their orientation axes intersect with each other.

The split-fiber nonwoven fabric is excellent in mechanical strength and has an attractive appearance, and it has been widely used for applications in packaging and interior finishing, and it has been improved in many aspects.

Also, a method is known for continuously producing a wide mesh stretched film which is provided with networks in a transverse direction by cutting intermittently an unstretched film in a transverse direction and then stretching the film in a cutting direction according to the present applicants (see, for example, patent document 3). A continuous mesh nonwoven fabric obtained by laminating split fibers having a mesh structure on the wide mesh stretched film described above has also been known from the work of the present applicants and has been manufactured.

REFERENCE DOCUMENT LIST

Patent Documents

Patent document 1: JP S47-2786 B
Patent document 2: JP S52-4672 B
Patent document 3: JP S55-107427 A However, in the split-fiber nonwoven fabrics described in patent documents 1 and 2, seams originating from their production method are present. Such seams cause problems in the appearance in certain cases, particularly when they are used in the form of long nonwoven fabrics. Furthermore, in a wound material prepared by winding a long nonwoven fabric, the wound material is not uniform due to large thicknesses at seam portions in certain cases in addition to the problems in appearance. This problem becomes particularly notable when the split-fiber nonwoven fabric is adhered with another substrate.

On the other hand, the mesh nonwoven fabric prepared by laminating split fibers (fibrillated-film fibers) having a mesh structure on the wide mesh stretched film does not have seams as described in patent document 3, and it is particularly suitable for use as a long nonwoven fabric. However, the split-fiber nonwoven fabrics described in patent documents 1 and 2 tend to be preferred in terms of appearance. Also, when combined with other materials, the mesh nonwoven fabric described in patent document 3 lacks smoothness because of its uneven thicknesses, and this needs to be improved.

A laminated mesh nonwoven fabric is desired which is seamless and provided with the same appearance as those of the split-fiber nonwoven fabrics and which can also be used as a long nonwoven fabric or in a wound form.

SUMMARY OF INVENTION

The present invention has been made to solve some of the problems described above. The present inventors have found that a mesh nonwoven fabric which is seamless and can maintain a fixed thickness and which is provided with the same appearance as that of a split-fiber nonwoven fabric is obtained by changing the form of the film constituting the nonwoven fabric, and they have thereby completed the present invention. That is, the present invention relates to a seamless mesh nonwoven fabric which is prepared by laminating a first mesh film containing stem fibers stretching substantially parallel to each other in a first direction and branch fibers connecting the adjacent stem fibers with each other, over a second mesh film containing stem fibers stretching parallel to each other in a second direction intersecting the first direction and branch fibers for connecting the adjacent stem fibers with each other.

In the mesh nonwoven fabric described above, the first mesh film is preferably obtained by subjecting a uniaxially stretched multilayer polyolefin film to fiber splitting in the first direction and then widening it in the second direction, and the second mesh film is preferably obtained by forming slits in a multilayer polyolefin film along the second direction and then uniaxially stretching the film in the second direction.

According to another embodiment, the present invention relates to a seamless long mesh nonwoven fabric containing the mesh nonwoven fabric described above, wherein its length is at least greater than its width.

According to yet another embodiment, the present invention relates to a mesh nonwoven fabric wound body prepared by winding the long mesh nonwoven fabric described above into a roll form.

According to a different embodiment, the present invention relates to a method for producing a mesh nonwoven fabric, comprising the steps of obtaining a first long mesh film by subjecting a uniaxially stretched multilayer polyolefin film to fiber splitting in a longitudinal direction (machine direction) and then widening the film in a width direction, obtaining a second long mesh film by forming slits in a multilayer polyolefin film in a width direction and then uniaxially stretching the film in a width direction, and continuously laminating the first and second mesh films without seams and adhering them together.

According to yet another embodiment, the present invention relates to a seamless long mesh film containing stem fibers stretching parallel to each other substantially in a width direction and branch fibers connecting adjacent stem fibers to each other, wherein the length of the film is at least greater than its width.

According to yet another embodiment, the present invention relates to a laminate prepared by laminating another material on the long mesh film described above.

According to yet another embodiment, the present invention relates to a method for producing the long mesh film described above, comprising the steps of forming slits in a long multilayer polyolefin film in a width direction, and uniaxially stretching the slit film obtained in the previous step in the width direction.

According to yet another embodiment, the present invention relates to a method for producing the laminate described above, comprising the steps of forming slits in a long multilayer polyolefin film in a width direction, uniaxially stretching the slit film obtained in the previous step in a width direction to obtain a long mesh film, and continuously laminating another material on the long mesh film described above and adhering them together.

According to the present invention, a mesh nonwoven fabric can be provided which has the same appearance as that of a conventional split-fiber nonwoven fabric and has no seams and which is useful as a long nonwoven fabric or as a wound body. A wound body containing such mesh nonwoven fabric as described above is seamless and therefore is advantageous in terms of excellent uniformity. Furthermore, the mesh nonwoven fabric according to the present invention has better feel to the touch than the mesh nonwoven fabrics prepared by conventional technologies and has improved use feel particularly when used as packaging materials or interior materials.

DESCRIPTION OF THE PREFERRED EMBODIMENTS

The present invention shall be explained below in detail with reference to the embodiments and drawings. However, the embodiments shown below shall not restrict the present invention.

First Embodiment: Mesh Nonwoven Fabric

According to the first embodiment, the present invention relates to a mesh nonwoven fabric. The mesh nonwoven fabric according to the present embodiment is prepared by laminating a first mesh film containing stem fibers stretching parallel to each other and branch fibers for connecting the adjacent stem fibers described above, with the stem fibers being substantially arranged in a first direction, and a second mesh film containing stem fibers stretching parallel to each other and branch fibers connecting adjacent stem fibers described above, with the stem fibers being substantially arranged in a second direction intersecting the first direction, and does not have seams.

In this regard, the term "substantially arranged in a first direction" means that the stem fibers in the first mesh film are arranged substantially all in a certain fixed direction, but not all the stem fibers have to be arranged strictly in the same direction, and errors or variations of, for example, about 10° may be present. Also, similarly, the term "substantially arranged in the second direction" means that the stem fibers in the second mesh film are arranged substantially all in a fixed direction which is different from the first direction, but not all the stem fibers have to be arranged strictly in the same direction, and errors or variations of, for example, about 10° may be present. Also, the term "intersecting" means that the first direction is different from the second direction, and the two directions may cross preferably at right angles plus 0° to 20°, and more preferably cross at substantially right angles. The term "cross at substantially right angles" means that errors or variations of preferably about ±15° from the right angles may be present.

Figure 1:
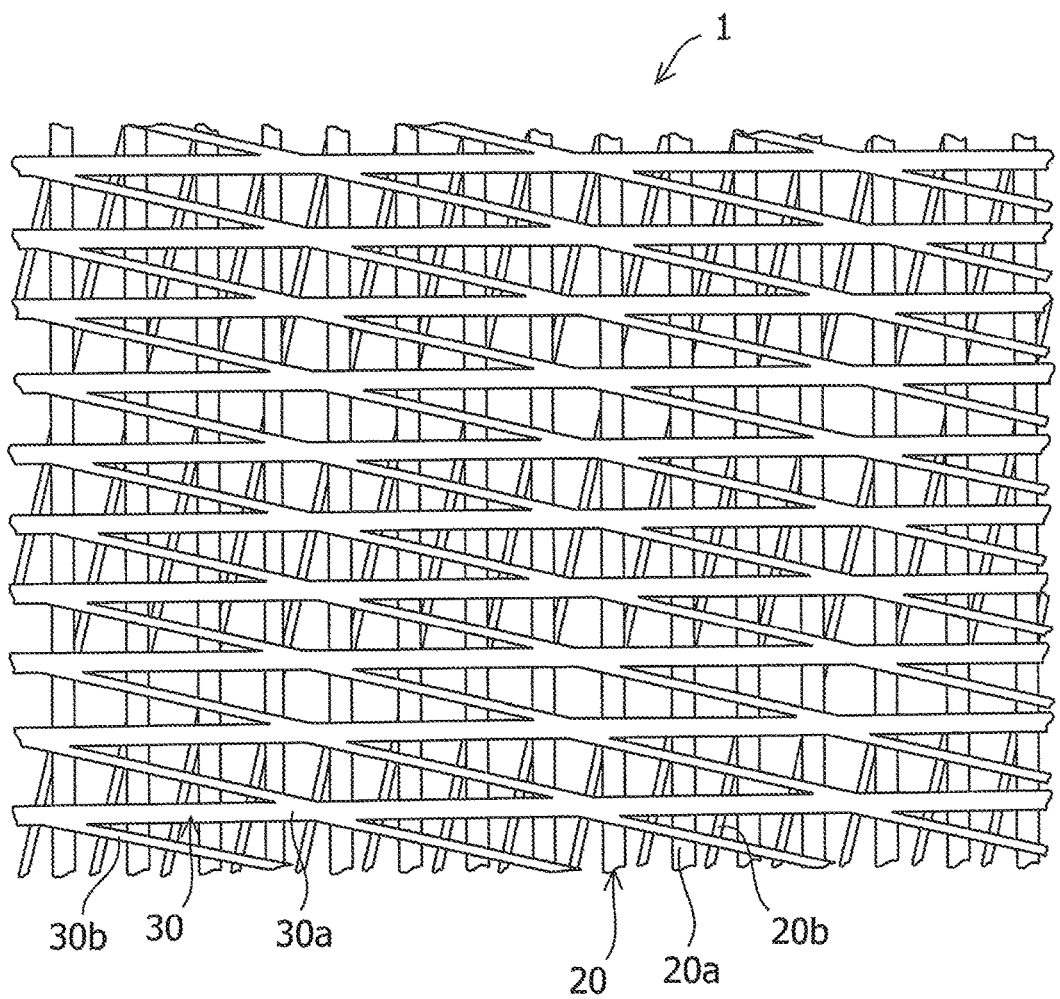
FIG. 1 is a schematic view showing a part of one example of the mesh nonwoven fabric according to the present invention.

FIG. 1 is a schematic plan view showing one example of the mesh nonwoven fabric according to the present embodiment. The mesh nonwoven fabric may be long in certain cases, and only a part thereof is shown in FIG. 1. The mesh nonwoven fabric 1 is formed by laminating a first mesh film 20 on a second mesh film 30. The first mesh film 20 contains stem fibers 20a and branch fibers 20b, and the stem fibers 20a concerned are substantially arranged in the first direction. In the embodiment illustrated, the first direction is substantially a longitudinal direction. Also, adjacent stem fibers 20a stretch side by side and are arranged substantially parallel. The second mesh film 30 also contains stem fibers 30a and branch fibers 30b, and the stem fibers 30a concerned are substantially arranged in the second direction. In the embodiment illustrated, the second direction is substantially a width direction. Also, the adjacent stem fibers 30a stretch side by side and are arranged substantially parallel.

In the present specification, the term "length direction" means the machine direction or the delivering direction of a film when producing the nonwoven fabric or films which constitute the fabric, and it may also be referred to as the longitudinal direction. On the other hand, the term "width direction" means a direction perpendicular to the length direction, that is, the width direction of the nonwoven fabric and films constituting the fabric, and it may also be referred to as the transverse direction. When referred to as substantially the length direction and substantially the width direction, they mean directions deviating by about ±10° from the length or width direction.

In the above case, the stem fibers 20a of the first mesh film 20 intersect the stem fibers 30a of the second mesh film 30. In the embodiment illustrated, the stem fibers 20a are substantially orthogonal to the stem fibers 30a. Also, the branch fibers 20b of the first mesh film 20 intersect the branch fibers 30b of the second mesh film 30 as well, and they are preferably substantially orthogonal to each other. The first mesh film 20 and the second mesh film 30 are adhered to each other, preferably thermally fused, at contact surfaces.

Figure 2A:
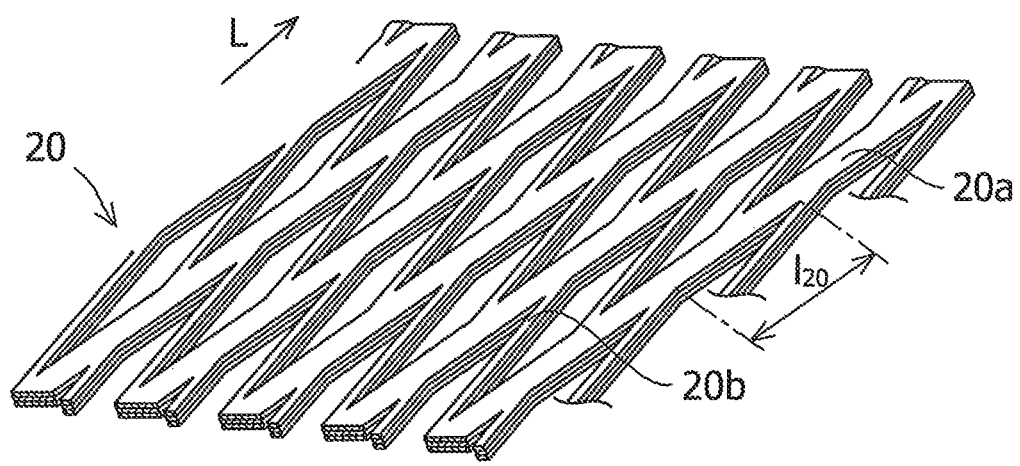
FIGS. 2A and 2B are partial perspective views showing one example of the first mesh film (longitudinal web) constituting the mesh nonwoven fabric shown in FIG. 1.
Figure 2B:
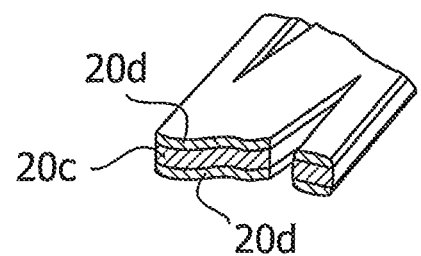

A perspective view of the simple substance of the first mesh film 20 before laminated to constitute the mesh nonwoven fabric 1 is shown in FIGS. 2A and 2B. The first mesh film 20 has, as shown in FIG. 2B, a layer structure in which laminated on both surfaces of a layer 20c made of a first thermoplastic resin is a layer 20d made of a second thermoplastic resin having a lower melting point than that of the first thermoplastic resin. The film 20 is constituted, as shown in FIG. 2A, by a plurality of the stem fibers 20a and the branch fibers 20b. The branch fiber 20b is narrower than the stem fiber 20a, and the first mesh film 20 is mechanically strengthened primarily by the stem fibers 20a. In the embodiment illustrated, the stem fibers 20a are substantially oriented in a lengthwise direction, that is, a longitudinal direction, of the first mesh film 20, and therefore the first mesh film 20 is also referred to as a longitudinal web.

The thickness of the layer 20d made of the second thermoplastic resin accounts for 50% or less, preferably 40% or less, of the entire thickness of the first mesh film 20. In order to satisfy various physical properties such as adhesive strength in thermally fusing with the second mesh film 30, described later, and the like, the thickness of the layer 20d made of the second thermoplastic resin may be 3 μm or more, and it is preferably selected from a range of 4 to 100 μm.

The resins constituting the first mesh film 20 include, for example, polyolefins such as polyethylene and polypropylene, and their copolymers, polyesters such as polyethylene terephthalate and polybutylene terephthalate, and their copolymers, polyamides such as nylon 6 and nylon 66, and their copolymers, polyvinyl chloride, polymers and copolymers of methacrylic acid or its derivatives, polystyrene, polysulfone, polytetrachloroethylenepolycarbonate, polyurethane, or the like. The first mesh film 20 has a high tensile strength in its stretching direction. Among the resins described above, polyolefins and their polymers, and polyesters and their polymers, each giving a good fiber splitting property, are preferred. Also, a difference in melting points between the first mesh film thermoplastic resin and the second thermoplastic resin has to be at least 5° C., and is preferably 10 to 50° C., for production reasons.

In the first mesh film 20, the ratio between the width of the stem fiber 20a and that of the branch fiber 20b can be determined by a person skilled in the art according to purpose, and the width of the stem fiber 20a is preferably 1.2 times as large as the width of the stem fiber 20b.

As a production method of the first mesh film 20, a base film having a three-layer structure in which layers 20d made of the second thermoplastic resin are laminated on the opposite surfaces of the layer 20c made of the first thermoplastic resin is manufactured by extrusion molding such as a multilayer inflation method, a multilayer T-die method. Next, the base film is stretched in a longitudinal direction and is subjected to splitting (splitting treatment) in the same direction in a catch stitch form in the longitudinal direction by means of a splitter to form many parallel slits, and the film is widened in a direction orthogonal to the slits. This procedure provides the first mesh film 20 in which the stem fibers 20a are arranged, as shown in FIG. 2A, in the first direction, that is, substantially the longitudinal direction in the embodiment illustrated.

In the embodiment illustrated, the first direction in the first mesh film has been referred to as substantially the longitudinal direction, but the present invention shall not be restricted thereto. The direction of the stem fibers in the first mesh film shall not be restricted to the longitudinal direction.

Figure 3A:
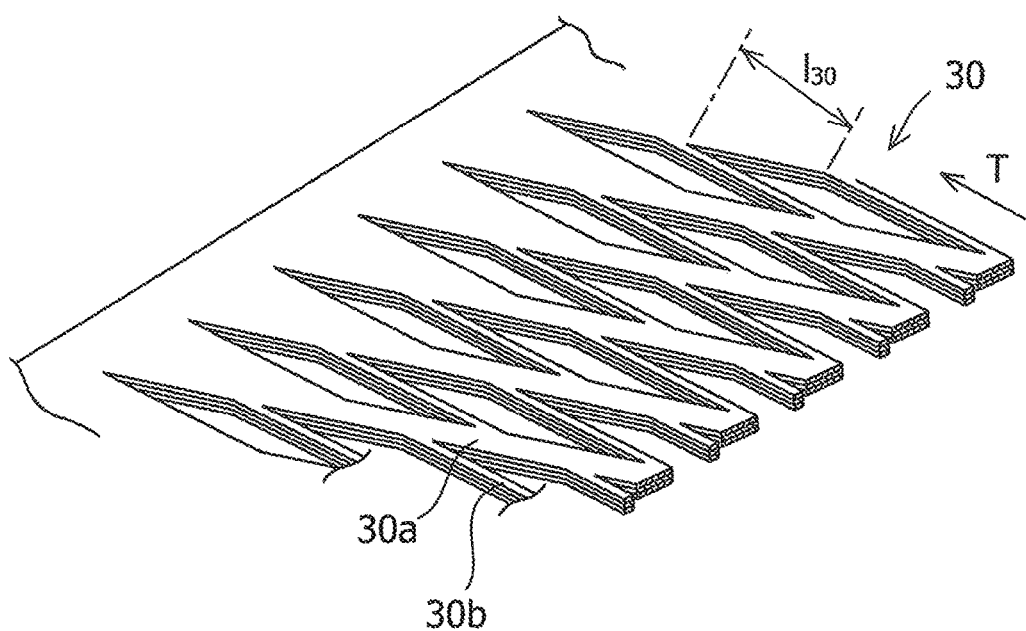
FIGS. 3A and 3B are partial perspective views of the second mesh film (transverse web) constituting the mesh nonwoven fabric shown in FIG. 1.
Figure 3B:
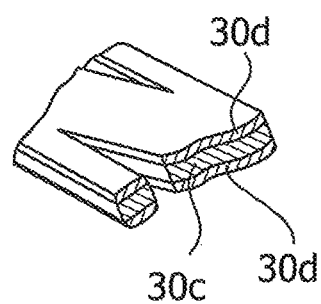

Next, FIGS. 3A and 3B show perspective views of the second mesh film 30 alone before laminated to form the mesh nonwoven fabric 1. The second mesh film 30 has, as shown in FIGS. 3A and 3B, a layer structure in which laminated on the opposite surfaces of a layer 30c made of a first thermoplastic resin are layers 30d made of a second thermoplastic resin having a lower melting point than that of the first thermoplastic resin. The second mesh film 30, when observed in a plan view, is formed, as shown in FIG. 3A, by a plurality of the stem fibers 30a and the branch fibers 30b, and the branch fibers 30b are narrower than the stem fibers 30a. In the second mesh film 30, the stem fibers 30a are substantially oriented in the width direction or the transverse direction, and therefore, the second mesh film 30 may also be referred to as a transverse web.

The relationship of the entire thickness of the second mesh film 30 with the thickness of the layer 30d made of the second thermoplastic resin is the same as what has been explained with reference to the first mesh film 20 as above, and substantially the same material as that was used for the first mesh film 20 can be used as a resin material constituting the second mesh film 30. Accordingly, detailed explanations thereof are omitted. The first mesh film 20 and the second mesh film 30 are preferably made of the same thermoplastic resin.

In the second mesh film 30, the ratio of the width of the stem fiber 30a and that of the branch fiber 30b can be determined by a person skilled in the art according to purpose, and the width of the stem fiber 30a is preferably, for example, at least 1.2 times as large as the width of the branch fiber 30b.

As a production method of the second mesh film 30, a base film having a three-layer structure in which the layers 30d made of the second thermoplastic resin are laminated on the opposite surfaces of the layer 30c made of the first thermoplastic resin is manufactured. Next, the base film is subjected to slit treatment along the second direction which is substantially the width direction (T direction shown in FIGS. 3A and 3B) in the embodiment illustrated to form many parallel slits. Then, the base film is stretched in the second direction or the width direction (T direction shown in FIGS. 3A and 3B) in the embodiment illustrated. As described above, the slits are formed in advance in the base film, and then the film is stretched in the width direction, so that the second mesh film 30 having the stem fibers 30a and the branch fibers 30b is obtained. The slits in the width direction can be formed by passing and transporting the base film between a rotating roller having projections formed on the outer peripheral surface and another rotating roller having an opposing flat outer peripheral surface.

In the embodiment illustrated, the second direction for the second mesh film has been essentially referred to as the width direction, but the present invention is not restricted to such embodiment. The direction of the stem fibers is not restricted to the width direction and can suitably be changed depending on the angle of the blades in the slitter.

In one embodiment, the pattern of the second mesh film 30 is a pattern obtained by rotating the pattern of the first mesh film 20 by 90° or −90°. In this connection, the pattern shall be referred to as a continuous pattern formed by the shapes of the stem fibers, the branch fibers and the opening parts formed by them when observing the first mesh film and the second mesh film, respectively, in a plan view. Accordingly, in the case described above, the width of the stem fiber 20a in the first mesh film 20 may be the same as that of the stem fiber 30a in the second mesh film 30. Also, the length (shown by $l_{20}$ in FIGS. 2A and 2B) of the opening part formed by the stem fiber 20a and the branch fiber 20b in the first mesh film 20 along the stem fiber 20a may be the same as the length (shown by $l_{30}$ in FIGS. 3A and 3B) of the opening part formed by the stem fiber 30a and the branch fiber 30b in the second direction 30 along the stem fiber 30a. Also, in the branch fiber 20b in the first mesh film 20 and the branch fiber 30b in the second direction 30, the widths and lengths of the opening parts along the branch fiber 20b and the branch fiber 30b are the same, respectively. In this case, the appearance is the same as that of the split-fiber nonwoven fabric.

In another embodiment, the width of the stem fiber 20a in the first mesh film 20 may be different from that of the stem fiber 30a in the second direction 30. Also, the length $l_{20}$ of the opening part formed by the stem fiber 20a and the branch fiber 20b in the first mesh film 20 along the stem fiber 20a may be different from the length $l_{30}$ of the opening part formed by the stem fiber 30a and the branch fiber 30b in the second direction 30 along the stem fiber 30a.

The mesh nonwoven fabric according to the present invention is preferably provided with the characteristics described above so that the length preferably is at least larger than the width. The length in this case is referred to as a dimension in the longitudinal direction defined above, that is, a machine direction or a delivering direction when producing the nonwoven fabric or the films constituting the fabric. Also, the width is referred to as a dimension in a direction orthogonal to the longitudinal direction. Accordingly, the phrase "the length is greater than the width" means usually that the length is greater than the maximum width which may be determined by the production machine. The mesh nonwoven fabric according to the present invention is different from mesh nonwoven fabrics produced by conventional technologies and is not composed of cut films. Accordingly, it is seamless.

Figure 4:
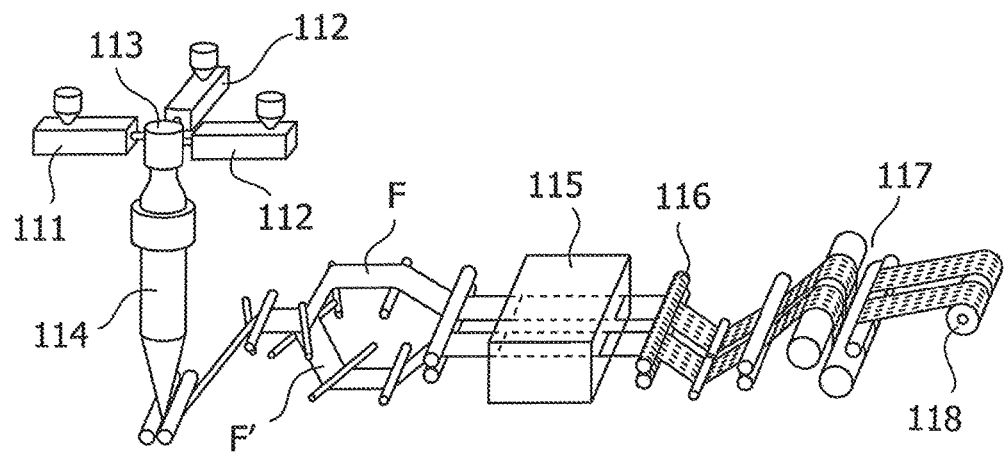
FIG. 4 is a schematic view showing a manufacturing apparatus used for manufacturing the first mesh film (longitudinal web) shown in FIGS. 2A and 2B.

Next, the mesh nonwoven fabric 1 shown in FIG. 1 according to the present embodiment shall be explained from the viewpoint of the production method while referring to the drawings. FIG. 4 is a schematic view showing the manufacturing method of the first mesh film 20 which is one embodiment of the present invention. As shown in FIG. 4, the first mesh film 20 is produced by passing primarily through the steps of (1) forming a multilayer film, (2) orientating the multilayer film, (3) splitting the orientated multilayer film parallel to the orientation axis, and (4) winding the split film, or the like.

The respective steps will be explained below. In the step of (1) forming the multilayer film in FIG. 4, the second thermoplastic resin having a lower melting point than that of the first thermoplastic resin is supplied to a main extruding machine 111, and the first thermoplastic resin as an adhesive layer resin is supplied to two subsidiary extruding machines 112, wherein the thermoplastic resin extruded from the main extruding machine 111 is used for a central layer (orientated layer), and the adhesive layer resin extruded from the two subsidiary extruding machines 112, 112 is used for an inner layer and an outer layer to prepare a multilayer film by inflation molding. In this connection, the first thermoplastic resin constitutes the layer 20c shown in FIGS. 2A and 2B made of the first thermoplastic resin, and the second thermoplastic resin constitutes the layer 20d shown in FIGS. 2A and 2B made of the second thermoplastic resin. Shown in FIG. 4 is an example in which the film is produced by blowing-down water-cooling inflation 114 passing through a multilayer circular die 113 by means of three extruding machines. A multilayer inflation method, a multilayer T-die method or the like can be used as a production method for the multilayer film, and it is not specifically restricted.

In the orientation step (2), the multilayer circular film produced above is cut into two films F, F', and they are allowed to pass through an oven 115 equipped with an infrared heater, a hot air blower or the like, and subjected to roll orientation with an orientation ratio of 1.1 to 15, preferably 5 to 12, and more preferably 6 to 10, based on the initial dimension while heating at a prescribed temperature. If the stretching ratio is less than 1.1, the mechanical strength is likely to be unsatisfactory. On the other hand, if the stretching ratio exceeds 15, it may become difficult to stretch the film by an ordinary method, and expensive equipment is required. The film is stretched preferably in several stages for preventing uneven stretching. The orientating temperature described above is not higher than the melting point of the thermoplastic resin in the central layer and falls in a range of usually 20 to 160° C., preferably 60 to 150° C., and more preferably 90 to 140° C., and the film is stretched preferably in several stages.

In the splitting (film splitting) step (3), the orientated multilayer film described above is brought into contact with a splitter (rotating blade) 116 which rotates at a high speed while sliding thereon, whereby the film is subjected to splitting treatment (film splitting). Many fine slits may be formed by a splitting method such as, in addition to the method described above, mechanical methods including a method of tapping a multilayer uniaxially oriented film, a method of twisting, a method of sliding and rubbing (abrading), a brushing method, or the like, an air jet method, an ultrasonic method, a laser method or the like. Among them, a rotary mechanical method is particularly preferred. Splitters used for the rotary mechanical method described above include splitters of various shapes such as a tap screw splitter, a file-shaped rough surface splitter, or a needle roll-shaped splitter. For example, splitters which are pentagonal or hexagonal and have screw threads of 10 to 150, preferably 15 to 100 per inch, are usually used as the tap screw splitter. A splitter described in JP S51-38980 Y (utility model publication) is suitably used as the file-shaped rough surface splitter. The file-shaped rough surface splitter is obtained by processing the surface of a shaft having a circular cross section into a file for iron works or a rough surface body similar thereto, and providing the surface with two spiral grooves with an equal pitch. The specific examples thereof include splitters disclosed in U.S. Pat. Nos. 3,662,935 and 3,693,851, or the like. The method for manufacturing the first mesh film 20 described above is not specifically restricted and includes preferably a method in which a splitter is disposed between nip rolls and in which a multilayer uniaxially oriented film is allowed to move while applying a tensile force thereon and is brought into contact with the splitter rotating at a high speed while sliding thereon to split the film, whereby it is turned into a mesh film.

The moving speed of the film in the splitting step described above is usually 1 to 1,000 m/minute, preferably 10 to 500 m/minute. Also, the rotating speed (peripheral speed) of the splitter can suitably be selected according to the physical properties and moving speed of the film, the properties of the targeted first mesh film 20, or the like, and it is usually 10 to 5,000 m/minute, preferably 50 to 3,000 m/minute.

The thus-split film formed in the manner described above is widened if desired, then subjected to heat treatment, and wound in a prescribed length at the winding step (4) 118, and it is supplied as the first mesh film 20 which is one of the base materials for the mesh nonwoven fabric.

Figure 5:
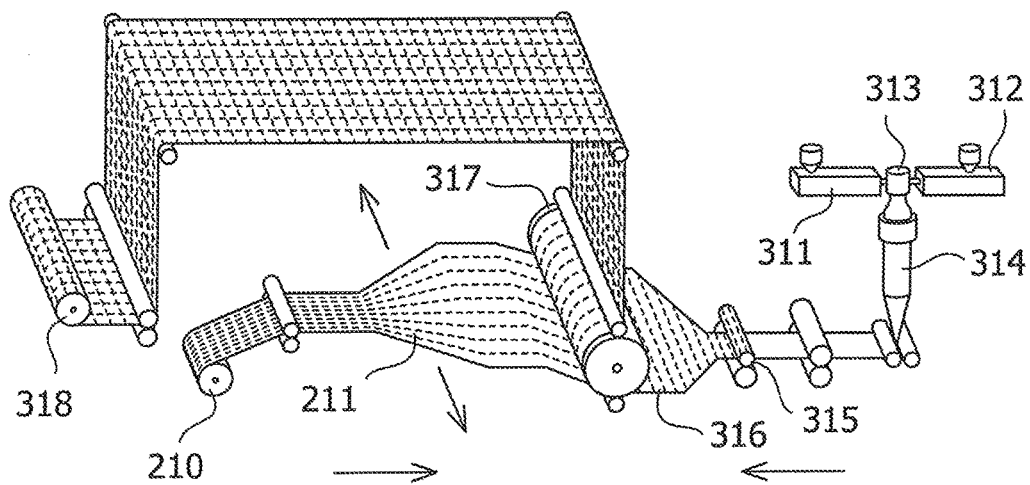
FIG. 5 is a schematic view showing a manufacturing apparatus used for manufacturing the mesh nonwoven fabric shown in FIG. 1.

FIG. 5 is a schematic view showing the production step for the mesh nonwoven fabric 1 prepared by laminating the first mesh film 20 and the second mesh film 30 together, which is one embodiment in the present application. As shown in FIG. 5, it contains primarily the steps of (1) forming a multilayer film, (2) subjecting the multilayer film to slit treatment substantially perpendicularly with respect to the longitudinal direction of the film, (3) transversely and uniaxially orientating the slit multilayer film, and (4) overlaying and thermally compressing the first mesh film 20 which is a longitudinal web on the transversely and uniaxially oriented slit film (second mesh film 30).

The respective steps shall be explained below. In the step (1) of forming the multilayer film in FIG. 5, the first thermoplastic resin is supplied to a main extruding machine 311, and the second thermoplastic resin is supplied to a subsidiary extruding machine 312, wherein the first thermoplastic resin extruded from the main extruding machine 311 is used for an inner layer, and the second thermoplastic resin extruded from the subsidiary extruding machine 312 is used for an outer layer to prepare a double layer film by inflation molding. In this connection, the first thermoplastic resin constitutes the layer 30c made of the first thermoplastic resin shown in FIGS. 3A and 3B, and the second thermoplastic resin constitutes the layer 30d made of the second thermoplastic resin shown in FIGS. 3A and 3B. Shown in FIG. 5 is an example in which the film is produced by blowing-down water-cooling inflation 314 passing through a multilayer circular die 313 by using two extruding machines. A multilayer inflation method, a multilayer T-die method or the like can be used as the production method for the multilayer film as is the case with the example shown in FIG. 4, and such method is not specifically restricted.

At the slitting step (2), the circular multilayer prepared above is provided with transverse slits 315 in a staggered manner substantially perpendicularly with respect to the running direction. The slit method described above includes cutting by a sharp blade such as a razor blade, a high speed rotating blade or the like. Also, a score cutter, a shear cutter or the like may be used for forming slits. In particular, a heat cutter is most preferred for forming slits. The examples of the heat cutter are disclosed in JP S61-11757 B and U.S. Pat. Nos. 4,489,630 and 2,728,950, or the like.

At the orientating step (3), the film subjected to the slit treatment is subjected to transverse orientating 316. The transverse orientating can be achieved by a tenter method, a pulley method, or the like, and the pulley method is preferred due to the small size of equipment and economic efficiency. The use of a pulley has been disclosed in UK Patent No. 849,436 and JP S57-30368 B. The conditions such as the orientating temperature and the like are the same as those of the foregoing example shown in FIG. 4.

The transversely and uniaxially oriented second mesh film 30 (transverse web) is transported to the thermal compression step (4) 317. Also, the first mesh film 20 (longitudinal web) produced by the method shown in FIG. 4 is delivered from an original fabric delivering roll 210 and allowed to run at a prescribed feeding speed, and it is sent to a widening step 211, widened several times by means of the widening device described above and subjected, if necessary, to heat treatment. This longitudinal web is superposed on the transverse web described above and sent to the thermocompression step 317, and the longitudinal web is laminated on the transverse web so that their orientation axes intersect, followed by thermocompressing them. After examining defects such as small tears, it is transported to a winding step 318 to prepare the product of the mesh nonwoven fabric 1.

The product of the mesh nonwoven fabric 1 thus obtained can be turned into a long mesh nonwoven fabric. The long mesh nonwoven fabric in the present embodiment is a seamless nonwoven fabric continuously manufactured and is referred to as a nonwoven fabric which is at least longer in a length of a mechanical direction than a maximum width originating in a width of the production apparatus. Seams are not present in the long mesh nonwoven fabric, and therefore, it has the advantage that it has a high utility and can be used for various applications.

In a particular embodiment, such the long mesh nonwoven fabric as described above can be used in the form of a mesh nonwoven fabric-wound body by winding it in a roll shape. The mesh nonwoven fabric wound-body is excellent in its uniformity because of no seams on the mesh nonwoven fabric.

Second Embodiment: Long Mesh Film

According to the second embodiment, the present invention relates to a seamless long mesh film containing stem fibers stretching parallel to each other substantially in a width direction and branch fibers for connecting the adjacent stem fibers described above, wherein a length is at least greater than a width. The long mesh film may be the long second mesh film explained in the mesh nonwoven fabric described above. Accordingly, a production method therefor may be the same as what has been explained for the second mesh film while referring to FIGS. 3 and 5.

The long mesh film according to the second embodiment is particularly useful in applications in which it is laminated on another material.

Third Embodiment: Laminate with Another Material

According to the third embodiment, the present invention relates to a laminate prepared by laminating another material on the long mesh film according to the second embodiment. Another material may be optional resin films, papers, cloths, metal foils, nonwoven fabrics, nets and the like which can be laminated continuously on the long mesh film in a machine direction, and it is preferably a resin film and a nonwoven fabric each having an optional long sheet shape. Another material is not restricted as long as it has a lower strength in the second direction than in the first direction in laminating on the long mesh film and satisfies the purpose of reinforcing the film in the second direction. Preferably, the first direction is substantially a longitudinal direction, and the second direction is substantially a width direction, but they are not restricted to specific directions. One example thereof may be a polyolefin film or a polyolefin mesh body of a long sheet shape. The polyolefin mesh body of a long sheet shape includes a nonwoven fabric or a woven fabric prepared by laminating thereon a multilayer polyolefin tape uniaxially stretched in a longitudinal direction. The commercially available products thereof include, for example, Meltac manufactured by Hagihara Industries Inc., Sofnet and Sofcloth (trade names) manufactured by Sekisui Film Co., Ltd., Crenette (trade name) manufactured by Kurabo Industries Ltd., Conwednet and Thermanet (trade names) manufactured by Conwed Co., Ltd., and the long sheet-shaped nonwoven fabric includes Tyvek (trade name) manufactured by DuPont-Asahi Co., Ltd., Tufnell and Syntex (trade names) manufactured by Mitsui Chemicals, Inc., Volans and Ecule (trade names) manufactured by Toyobo Co., Ltd., Bemliese and Eltas (trade names) manufactured by Asahi Kasei Corporation, Elelves (trade name) manufactured by Unitika Ltd., or the like, but they are not restricted to these examples.

The production method for the laminate can be carried out by the steps of obtaining the long mesh film according to the second embodiment, laminating continuously an optional another material on the long mesh film preferably in a mechanical direction, and adhering them optionally and selectively by an optional step of fitting the base material. The laminate obtained can be turned into a wound body containing the laminate according to the uses.

The laminate according to the third embodiment has the advantages of the long mesh film according to the second embodiment and another material in combination, and it is advantageous in terms of not damaging a uniformity also in the form of the wound body.

INDUSTRIAL APPLICABILITY

The mesh nonwoven fabric according to the present invention is advantageous as packaging materials and interior materials. In particular, the mesh nonwoven fabric according to the present invention is seamless, and therefore, it is advantageous when it is used in the form of a long sheet for applications in which a greater length of the sheet than a width of the production apparatus is continuously required.

EXPLANATIONS OF REFERENCE SYMBOLS

1 Reticular nonwoven fabric
20 First mesh film
20a Stem fibers of first mesh film
20b Brach fibers of first mesh film
20c Layer made of first thermoplastic resin
20d Layer made of second thermoplastic resin
30 Second mesh film
20a Stem fibers of second mesh film
30b Brach fibers of second mesh film
30c Layer made of first thermoplastic resin
30d Layer made of second thermoplastic resin

The invention claimed is:

1. A seamless mesh nonwoven fabric comprising a first seamless mesh film and a second seamless mesh film laminated on the first mesh film, wherein
the first mesh film comprises first stem fibers which are arranged parallel to each other in a longitudinal direction and first branch fibers which are narrower than the first stem fibers, and are arranged parallel to each other in a direction inclined to the longitudinal direction, wherein each of the first branch fibers connects the first stem fibers that are adjacent to it;
the second mesh film comprises second stem fibers which are arranged parallel to each other in a transverse direction and second branch fibers which are narrower than the second stem fibers, and are arranged parallel to each other in a direction inclined to the transverse direction, wherein each of the first branch fibers connects the first stem fibers that are adjacent to it;
the first stem fibers of the first mesh film are almost orthogonal to the second stem fibers of the second mesh film; and
the first branch fibers of the first mesh film are almost orthogonal to the second branch fibers of the second mesh film, and
wherein a length of the seamless mesh nonwoven fabric is larger than a width of the seamless mesh nonwoven fabric, and the length is a dimension in the longitudinal direction that is a machine direction when producing the nonwoven fabric, or the first seamless mesh film and the second seamless mesh film constituting the fabric and the width is a dimension in a direction orthogonal to the longitudinal direction.

2. The seamless mesh nonwoven fabric according to claim 1, wherein
a length of an opening part formed by the first stem fibers and the first branch fibers along the first stem fibers in the first mesh film is the same as a length of an opening part formed by the second stem fibers and the second branch fibers along the second stem fibers in the second mesh film; and
a length of an opening part formed by the first stem fibers and the first branch fibers along the first branch fibers in the first mesh film is the same as a length of an opening part formed by the second stem fibers and the second branch fibers along the second branch fibers in the second mesh film.

3. The seamless mesh nonwoven fabric according to claim 1, wherein a pattern of the second mesh film is a pattern obtained by rotating a pattern of the first mesh film at 90° or −90°.

4. The seamless mesh nonwoven fabric according to claim 1, wherein each of the first and second mesh films comprises a layer consisting of a first thermoplastic resin, and a layer consisting of a second thermoplastic resin having a lower melting point than that of the first thermoplastic resin.

5. A mesh nonwoven fabric-wound body prepared by winding the seamless mesh nonwoven fabric according to claim 1 in a roll form.

6. A method for producing the seamless mesh nonwoven fabric according to claim 1, comprising:
a step of subjecting a uniaxially stretched multilayer polyolefin film to fiber splitting in a longitudinal direction (machine direction) and then uniaxially widening the film in a width direction to obtain a first mesh film,
a step of forming slits on a multilayer polyolefin film in a width direction and then uniaxially stretching the film in the width direction to obtain a second mesh film, and
a step of continuously laminating seamlessly the first and second mesh films and adhering them.

* * * * *